US005159304A

United States Patent [19]

Yamagata et al.

[11] Patent Number: 5,159,304

[45] Date of Patent: Oct. 27, 1992

[54] CURRENT LIMITING CIRCUIT BREAKER

[75] Inventors: Shinji Yamagata, Fukuyama; Yoshiaki Kobayashi, Amagasaki; Mitsugu Takahashi, Amagasaki; Takao Mitsuhashi, Amagasaki, all of Japan

[73] Assignee: Mitsubishi Denki Kabushiki Kaisha, Tokyo, Japan

[21] Appl. No.: 583,249

[22] Filed: Sep. 17, 1990

[30] Foreign Application Priority Data

Sep. 18, 1989 [JP] Japan ................................ 1-241341
Sep. 18, 1989 [JP] Japan ................................ 1-241342

[51] Int. Cl.[5] ........................................ H01M 9/02

[52] U.S. Cl. ................................ 335/202; 335/132; 335/16

[58] Field of Search .................... 335/6, 16, 195, 147; 200/144 R, 147 R, 202, 132

[56] References Cited

U.S. PATENT DOCUMENTS 2,174,669 10/1939 Sachs .................................. 335/201
3,136,921 6/1964 Dorfman .
3,815,059 6/1974 Spoelman ........................... 335/195
4,417,223 11/1983 Bancalari .
4,458,224 7/1984 Kralik et al. ......................... 335/16

FOREIGN PATENT DOCUMENTS 0030872 6/1981 European Pat. Off. .
0102867 3/1984 European Pat. Off. .

*Primary Examiner*—Lincoln Donovan
*Attorney, Agent, or Firm*—Burns, Doane, Swecker & Mathis

[57] ABSTRACT

The current limiting circuit breaker comprises a circuit breaker (1A) and at least one current limiting unit (1B); the circuit breaker (1A) has load side terminals (12) and power-source-side or connection terminals (2*a*), and the current limiting unit (1B) is unitized to be simply connected to the circuit breaker (1A) or to another current limiting unit (1B) at their power source side terminals; the current limiting unit (1B) has current limiting connection terminals (25*a*) which ride on the circuit breaker connection terminals (2*a*) or power-source-side terminals (20*a*) of another current limiting unit (1B) for connection, to the circuit breaker (1A) or another current limiting unit (1B).

1 Claim, 17 Drawing Sheets

CURRENT LIMITING CIRCUIT BREAKER

FIELD OF THE INVENTION AND RELATED ART STATEMENT

1. Field of the Invention

The present invention relates to an improvement in a circuit breaker provided with current limiting function.

2. Description of the Related Art

FIG. 24 is a schematic sectional view of a conventional circuit breaker of this kind which has been disclosed in, for example, the Japanese published examined patent application No. Sho 47-49669(Tokko Sho 47-49669). In FIG. 24, the conventional current limiting circuit breaker is composed of a circuit breaker A, which is disposed in upper part of an insulation case 1, and a current limiting unit B, which is disposed in lower part of the insulation case 1. A power source side connection terminal 2*a* of a stationary conductor 2 is fixed to a partition 1*a* (bottom of the circuit breaker A) of the insulation case 1 to be connected with an external conductor, and an inner end of the power source side connection terminal 2*a* has a stationary contact 3. A movable contact 4 facing the stationary contact 3 is provided at the movable member 5 which is held by a contact arm 6. The contact arm 6 is rotatably supported by a cross bar 7. An operation handle 8 is provided to project from the substantial center of the front face of the current limiting circuit breaker (upper face of the insulation case 1 of FIG. 24), and is constituted to move interlocked with the contact arm 6. A conductor 9 is fixed to the partition 1*a*, and an end of a flexible connection member 10, which is connect by the other end to the movable member 5, is connected to one end of the conductor 9. The other end of the conductor 9 is lead into the current limiting unit B, and said the other end of the conductor 9 lead in the current limiting unit B has a stationary contact 19. A movable contact 15 to be contacted or departed from the stationary contact 19 is provided on a movable contact arm 14. The movable contact arm 14, which is rotatable supported by a shaft 17, is turned by a spring 18 for bringing the movable contact 15 into contact with the stationary contact 19. And, the movable contact arm 14 is electrically connected to a load side terminal 12 through a flexible connection member 16.

In the circuit breaker A, an arc extinguish chamber 21 is disposed therein, and the current limiting unit B also contains an arc extinguish chamber 23.

Next, the flow of electric current in the above-mentioned conventional current limiting circuit breaker is elucidated with reference to the accompanying drawing of FIG. 24. FIG. 24 shows a state when the current limiting circuit breaker is in ON-state.

The electric current flows from the power source side connection terminal 2*a* into the circuit breaker A, and enters the conductor 9 through the stationary contact 3, the movable contact 4, the movable member 5 and the flexible connection member 10. And, the electrical current flows from the conductor 9 into the current limiting unit B, and enters the load side terminal 12 through the stationary contact 19, the movable contact 15, the movable contact arm 14 and the flexible connection member 16.

In the above-mentioned conventional current limiting circuit breaker, since the circuit breaker A and the current limiting unit B are disposed in two storied manner, the casing 1 of insulation material is larger in vertical direction (height as the current limiting circuit breaker) in comparison with that of a simple circuit breaker. Thus, the conventional current limiting circuit breaker is not adaptable to a thin distribution board or cabinet panel and is limited in usage, thereby not convenient use.

OBJECT AND SUMMARY OF THE INVENTION

An object of the present invention is to provide a current limiting circuit breaker which is capable of designing to disposed in a thin distribution board and miniaturization, and easy to use.

In order to achieve the above-mentioned object, the current limiting circuit breaker which is a combination of a circuit breaker unit and at least one current limiting unit comprises:

a circuit breaker unit which contains circuit breaking means and has a breaker connection terminal at one end and a load side terminal at the other end of the circuit breaker unit, and at least one current limiting unit which contains at least one current limiting means and has at least one power source side terminal at one end and at least one limiter connection terminal at the other end, the limiter connection terminal being for connection with the breaker connection terminal or with a power source side terminal of another current limiting unit.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the figures are schematic representations for purposes of illustration and do not necessarily depict the actual relative sizes or locations of the elements shown.

DESCRIPTION OF THE PREFERRED EMBODIMENTS

Hereafter, eight embodiments of the present invention are elucidated with reference to the accompanying drawings of FIGS. 1 to 23.

FIRST EMBODIMENT

Figure 1:
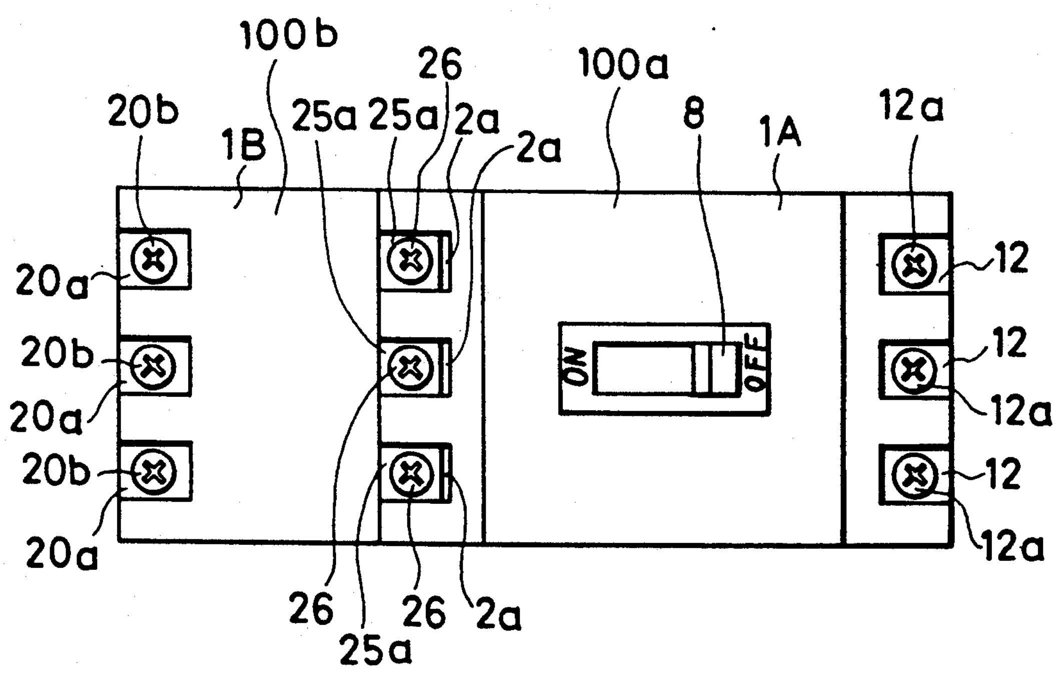
FIG. 1 is a plan view showing a current limiting circuit breaker of the first embodiment of the present invention.
Figure 2:
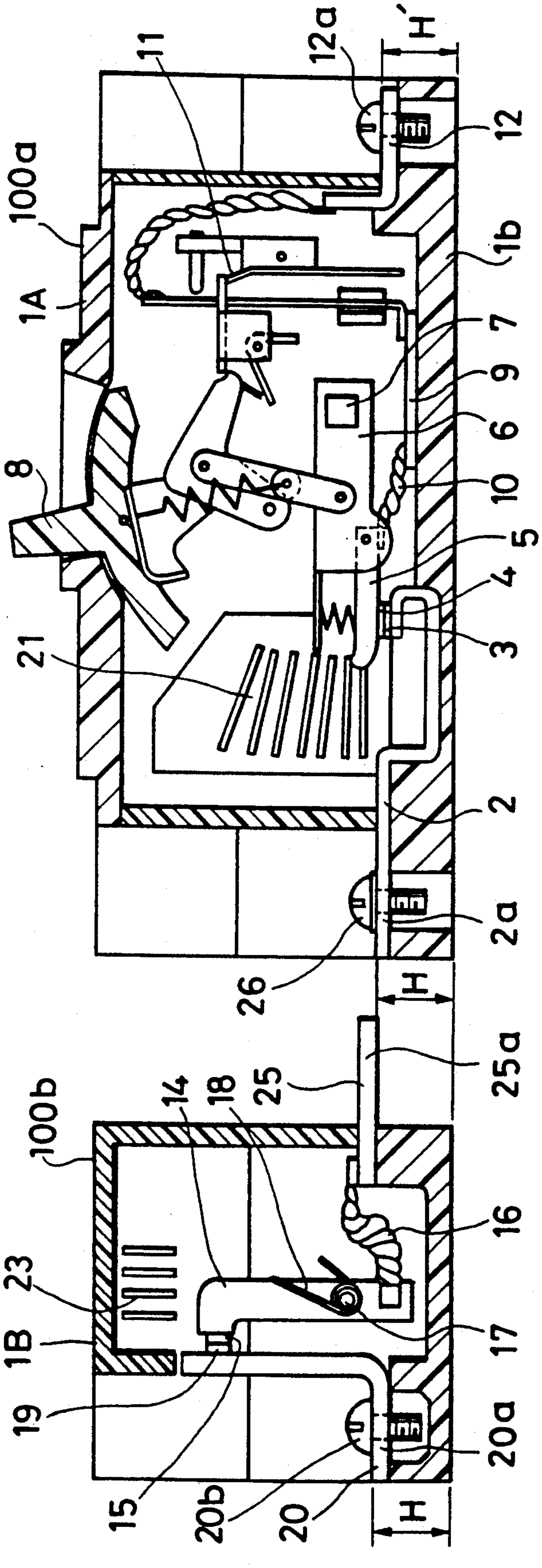
FIG. 2 is a longitudinal sectional side exploded view showing the current limiting circuit breaker of FIG. 1, with a current limiting unit removed therefrom.
Figure 3:
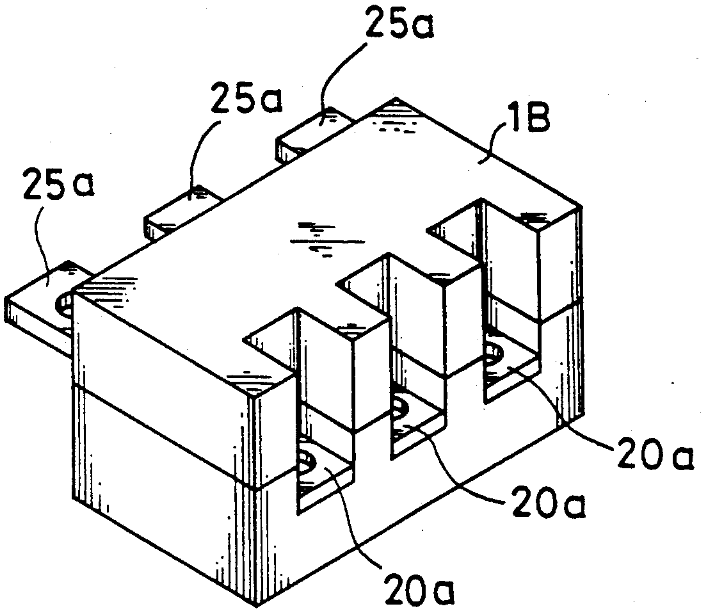
FIG. 3 is a perspective view showing the current limiting unit shown in FIG. 1.

FIGS. 1 to 3 show a first embodiment of a current limiting circuit breaker of the present invention. FIG. 1 shows a plan view of the current limiting circuit breaker, FIG. 2 is a longitudinal sectional side view showing a state where a current limiting unit 1B is removed from the current limiting circuit breaker, FIG. 3 shows a perspective view of the current limiting unit 1B.

The current limiting circuit breaker of the first embodiment comprise a circuit breaker unit 1A and a current limiting unit 1B which is attached to the side face of the circuit breaker unit 1A as shown in FIG. 1. Three load side terminals 12, 12 and 12 are provided on the right side end of the circuit breaker unit 1A shown in FIG. 1, and three power source side terminals 20*a*, 20*a* and 20*a* are provided on the left side end of the current limiting unit 1B shown in FIG. 1. The circuit breaker unit 1A and the current limiting unit 1B are formed integral by connecting a conductors 2 of the circuit breaker unit 1A and a connection conductor 25 of the current limiting unit 1B.

In the circuit breaker unit 1A, for instance, three stationary conductors 2 are fixed to a bottom 1*b* of the circuit breaker casing 100*a*, and inner end of the stationary conductors 2 each has a stationary contact 3. Movable contacts 4 facing to the stationary contacts 3 are provided on movable members 5 which are movably held by contact arms 6, respectively. Each contact arm 6 is rotatably supported by a cross bar 7. An operation handle 8 is provided projecting upward from the substantial center of the front face (upper face in FIG. 2) of the circuit breaker casing 100*a*. The contact arms 6 are turned about the cross bar 7 by turning the operation handle 8. A conductors 9, which are fixed to the bottom 1*b* of the circuit breaker casing 100*a*, connect one ends of flexible connection members 10, and the other ends of the flexible connection members 10 are connected to the movable members 5. The fixed conductors 9 are electrically connected to the load side terminals 12 through overcurrent trip units 11, respectively.

On the other hand, the connection conductors 25 of the current limiting unit 1B are provided projecting from a side face, where the circuit breaker unit 1A is to be attached for connecting with the stationary conductor 2 of the circuit breaker unit 1A. One end of the connection conductors 25 are led in a current limiting casing 100*b*, and to the other ends of the connection conductors 25 are connected one ends of flexible connection members 16. The other side ends of the flexible connection members 16 are connected to movable contact arms 14 having movable contacts 15, respectively. The movable contact arm 14, which is rotatably supported by a shaft 17, is always compressed by a spring 18 for bringing the movable contact arm 14 into contact with a stationary contact 19. The stationary contact 19 is provided on an end of a stationary conductor 20, and the other end of the stationary conductor 20 has the power source side terminal 20*a*. In the circuit breaker casing 100*a*, arc extinguish chambers 21 are disposed therein, and the current limiting casing 100*b* also contains arc extinguish chambers 23.

As shown in FIG. 2, the connection terminal 2*a* having terminal screw bolts 26 and the load side terminal 12 having terminal screw bolts 12*a* are provided on both side of the circuit breaker unit 1A. A height (H) of the connection terminal 2*a* and a height (H') of the load side terminal 12 are provided at the same height measured between each upper face of them and the lower face of the circuit breaker casing 100*a*, in this embodiment. A connection terminal 25*a* of the connection conductor 25 is projected from the side face of the current limiting unit 1B, and is provided to ride on the connection terminal 2*a* of the circuit breaker unit 1A. The power source side terminal 20*a* of the current limiting unit 1B is provided to have height H from the rear face of the current limiting casing 100*b* as shown in FIG. 2, and a terminal screw bolt 20*b* is attached thereto.

As shown by the perspective view of FIG. 3, by assembling into a unit of the current limiting unit 1B previously, the current limiting unit 1B can be connected with the circuit breaker unit 1A, when the current limiting unit 1B is juxtaposed with the circuit breaker unit 1A as shown in FIGS. 1 and 2. Because the connection terminal 25*a* of the current limiting unit 1B is disposed on the connection terminal 2*a* of the circuit breaker unit 1A, the current limiting unit 1B can laterally be connected integral with the circuit breaker unit 1A by using the terminal screw bolt 26 as shown in FIG. 1.

Hence, as the current limiting unit 1B shown in FIG. 3 has been previously prepared as an integral unit, the current limiting unit 1B can optionally and simply be connected even when the current limiting unit 1B is mounted at user's site, thereby expecting easy system-up by user. Also, in the above-mentioned case, the standardized type circuit breaker can be used, and thereby a low manufacturing cost is achievable.

Figure 4:
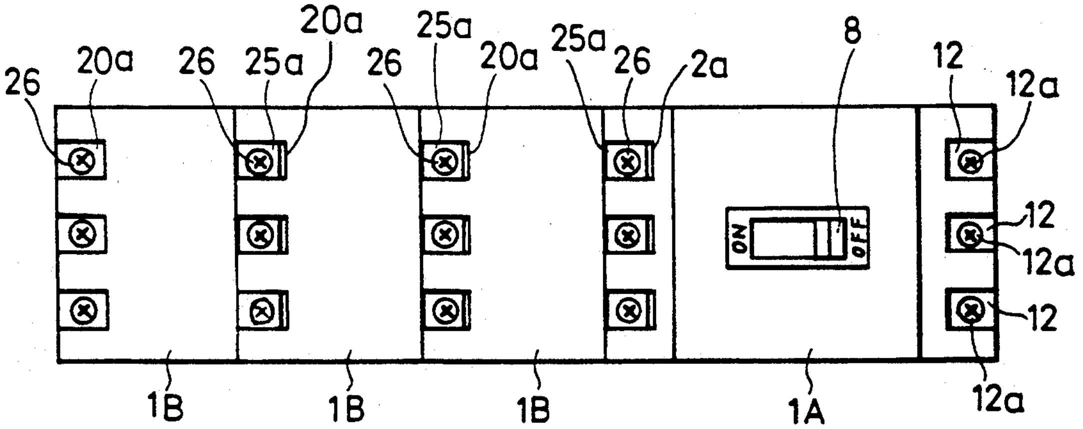
FIG. 4 is a plan view showing the current limiting circuit breaker including three current limiting units.
Figure 5:
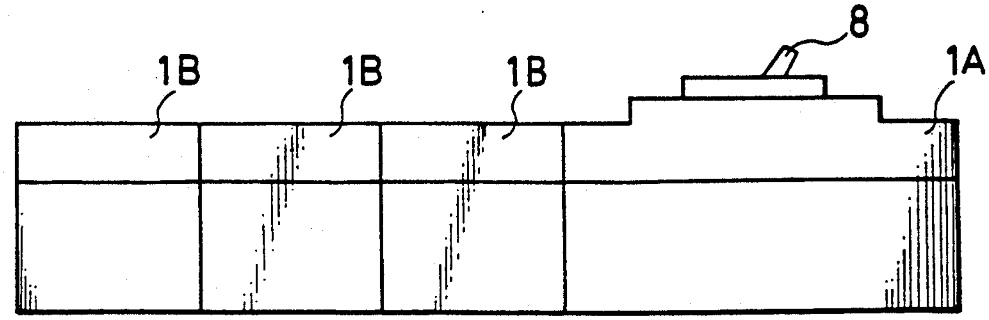
FIG. 5 is a side view showing the current limiting circuit breaker of FIG. 4.

Apart from the above-mentioned embodiment wherein one current limiting unit 1B is connected with the circuit breaker unit 1A, a modified embodiment may be such that any number of current limiting units 1B may be connected in accordance with need. For example, three current limiting units 1B, 1B and 1B may be connected in series as shown in FIG. 4 and FIG. 5, thereby raising current limiting ability. FIG. 4 is the plan view of the current limiting circuit breaker including three current limiting units 1B, 1B and 1B, and FIG. 5 is the side view thereof.

SECOND EMBODIMENT

Figure 6:
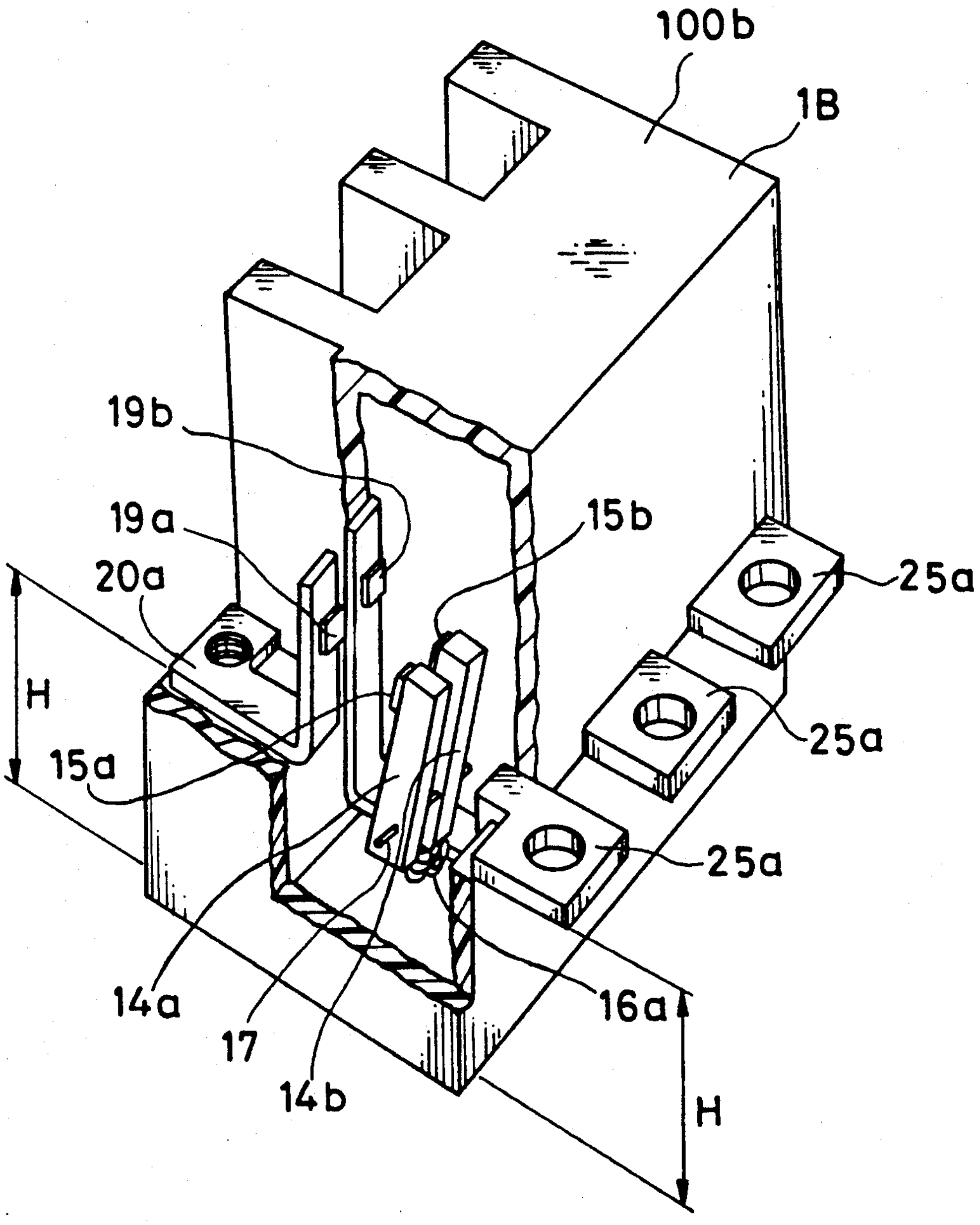
FIG. 6 is a perspective view showing a current limiting circuit breaker of a second embodiment of the present invention.

Next, a second embodiment of the current limiting circuit breaker of the present invention is elucidated with reference to the accompanying drawing of FIG. 6. FIG. 6 is the partially sectional perspective view of a current limiting unit 1B in the second embodiment. Corresponding parts and components to the first embodiment are shown by the same numerals and marks, and the description thereon made in the first embodiment similarly apply. Differences and features of this second embodiment from the first embodiment are as follows.

In FIG. 6, two parallel movable contact arms 14*a* and 14*b*, which are connected by a flexible connector 16*a* at bottom side of a current limiting casing 100*b*, are provided in a manner to rotate about a rotary shaft 17. Two movable contacts 15*a* and 15*b* are fixed to the movable contact arms 14*a* and 14*b*, respectively. Two stationary contacts 19*a* and 19*b* contact with the movable contacts 15*a*, 15*b* are fixed to both connection terminals 20*a*, and 25*a*, respectively. And, the movable contact arms 14*a*, 14*b* are pressed by springs (not shown) to make the movable contacts 15*a*, 15*b* contact the stationary contacts 19*a*, 19*b*, respectively.

In the current limiting circuit breaker of the second embodiment, an electric current flows from the connection terminal 25*a* to the power source side terminal 20*a* through the stationary contact 19*b*, the movable contact 15*b*, the movable contact arm 14*b*, the flexible connector 16*a*, the movable contact arm 14*a*, movable contactor 15*a* and the stationary contact 19*a*. Similarly to the first embodiment, the current limiting unit 1B of this second embodiment has a double break type configuration, and total length of the arc column is as long as twice of that of the single break type configuration, thereby achieving a good current limiting effect.

As seen from the above-mentioned the first and the Second embodiments of the present invention, the above-Mentioned current limiting unit 1B which has been previously unitized in an attachable box can be easily attached to a compact-sized circuit breaker which perse is expensive. Thereby, easy and suitable pairing of necessary and sufficient size of the circuit breaker and the current limiting circuit breaker is possible at a low cost.

THIRD EMBODIMENT

Figure 7:
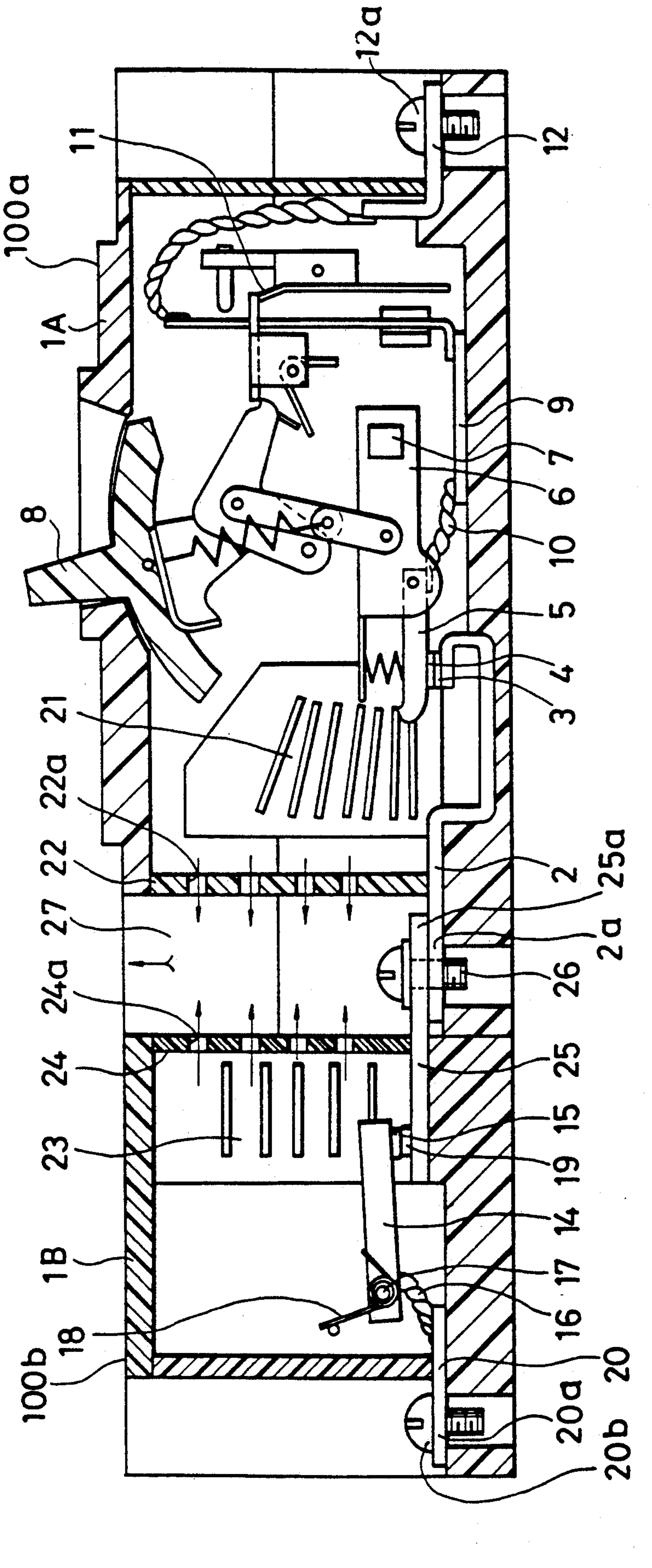
FIG. 7 is a longitudinal sectional side view showing a current limiting circuit breaker of a third embodiment of the present invention.

Next, a third embodiment of the current limiting circuit breaker of the present invention is elucidated with reference to the accompanying drawing of FIG. 7. FIG. 7 is the longitudinal sectional side view of the third embodiment. Corresponding parts and components to the first embodiment are shown by the same numerals and marks, and the description thereon made in the first embodiment similarly apply. Differences and features of this third embodiment from the first embodiment are as follows.

In the current limiting circuit breaker of the third embodiment, the current limiting unit 1B is juxtaposed with the circuit breaker unit 1A as shown in FIG. 7, wherein the connection terminals 25*a* of the current limiting unit 1B are vertically overlapped with the connection terminals 2*a* of the circuit breaker unit 1A. And, the connection terminals 25*a* are connected to the connection terminals 2*a* by the terminal screw bolts 26.

In the circuit breaker unit 1A, an arc extinguish chamber 21 is disposed therein, and an exhaust barrier 22 having arc gas exhaust ports 22*a* for discharging the arc gas also disposed therein. In the current limiting unit 1B, an arc extinguish chamber 23 and an exhaust barrier 24 having arc gas exhaust ports 24*a* are disposed therein, too. When the current limiting unit 1B is laterally attached to the circuit breaker unit 1A as shown in FIG. 7, an arc gas exhaust chamber 27 is formed in a space between the exhaust barrier 22 and the other exhuast barrier 24. As a result, arc gas which is exhaust from both the arc gas exhaust ports 22*a* and 24*a* is not immediately exhaust to the exterior of the current limiting circuit breaker casing, but deenergized in the arc gas exhaust chamber 27, and it is exhausted to the exterior.

In the above-mentioned third embodiment, since both of the arc gas exhaust ports 22*a* and 24*a* are disposed to face each other at a middle part of the assembled casing (100*a*+100*b*) of the current limiting circuit breaker, arc gas harmful to any other apparatus is discharged from the middle part of the assembled casing (100*a*+100*b*). Therefore, any other apparatus, e.g. another circuit breaker, can be disposed very close to the other end face of the current limiting circuit breaker casing.

FOURTH EMBODIMENT

Figure 8:
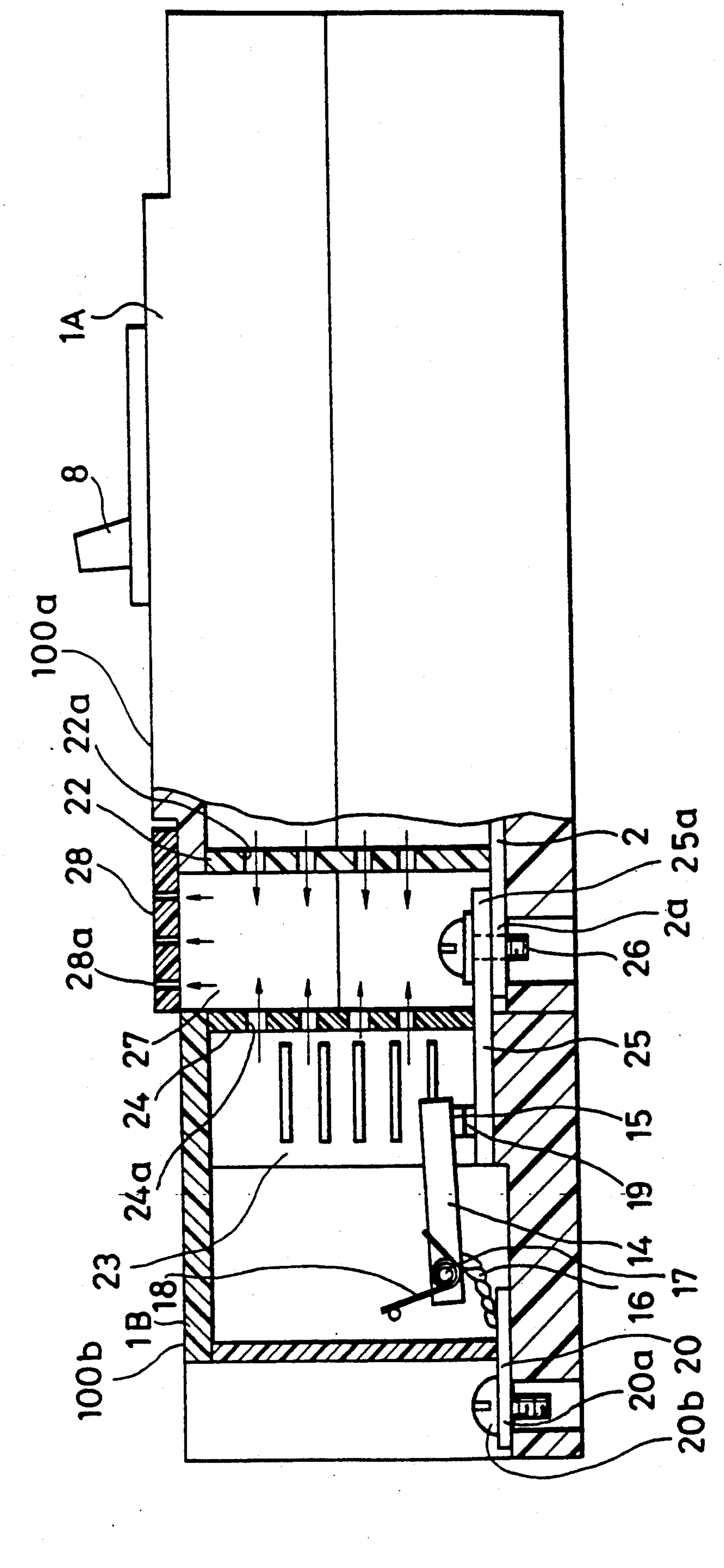
FIG. 8 is a partially longitudinal sectional side view showing a current limiting circuit breaker of a fourth embodiment of the present invention.
Figure 9:
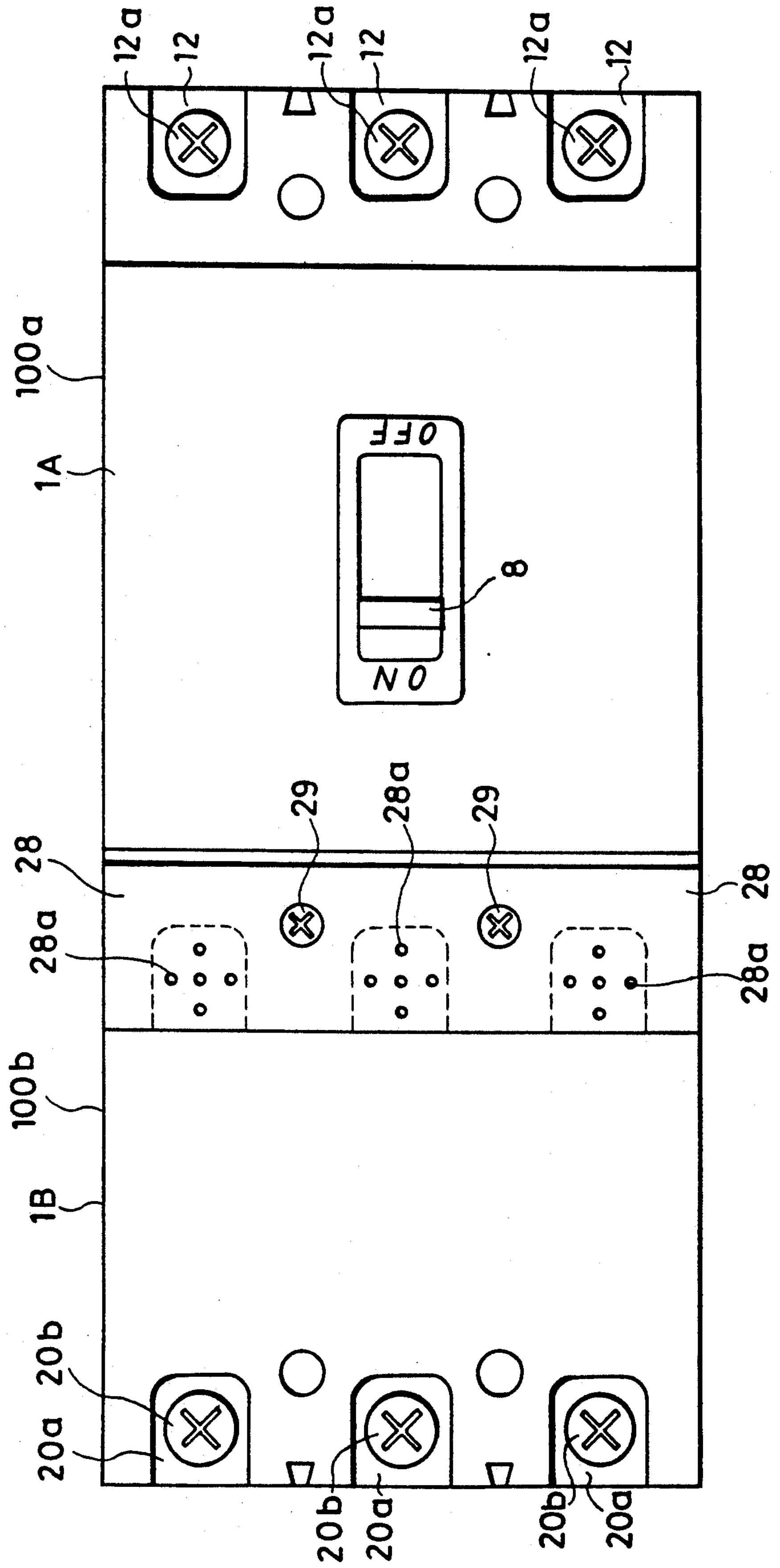
FIG. 9 is a plan view showing the current limiting circuit breaker of FIG. 8.

Next, a fourth embodiment of the current limiting circuit breaker of the present invention is elucidated with reference to the accompanying drawings of FIG. 8 and FIG. 9. FIG. 8 is a partially longitudinal sectional side view of the current limiting circuit breaker of the fourth embodiment, FIG. 9 is a plan view of the current limiting circuit breaker of FIG. 8. Corresponding parts and components to the third embodiment are shown by the same numerals and marks, and the description thereon made in the third embodiment similarly apply. Differences and features of this fourth embodiment from the third embodiment are as follows.

In the current limiting circuit breaker of the fourth embodiment, an insulation cover 28 having a plurality of small exhaust ports 28*a* is mounted with screw bolts 29 on the front surface of the circuit breaker casing 100*a* to close an upper opening of the arc gas exhaust chamber 27. As a result, arc gas within the arc gas exhaust chamber 27 is more effectively deenergized, thereby further reducing arc discharge to the exterior of the circuit breaker casing 100*a*. Hence, the current limiting circuit breaker can be mounted in a thin distribution board or cabinet panel, because an upper surface of the current limiting circuit breaker can be disposed to near the upper plate of the distribution board, thereby achieving reduction in thickness and miniaturizating of the apparatus.

FIFTH EMBODIMENT

Figure 10:
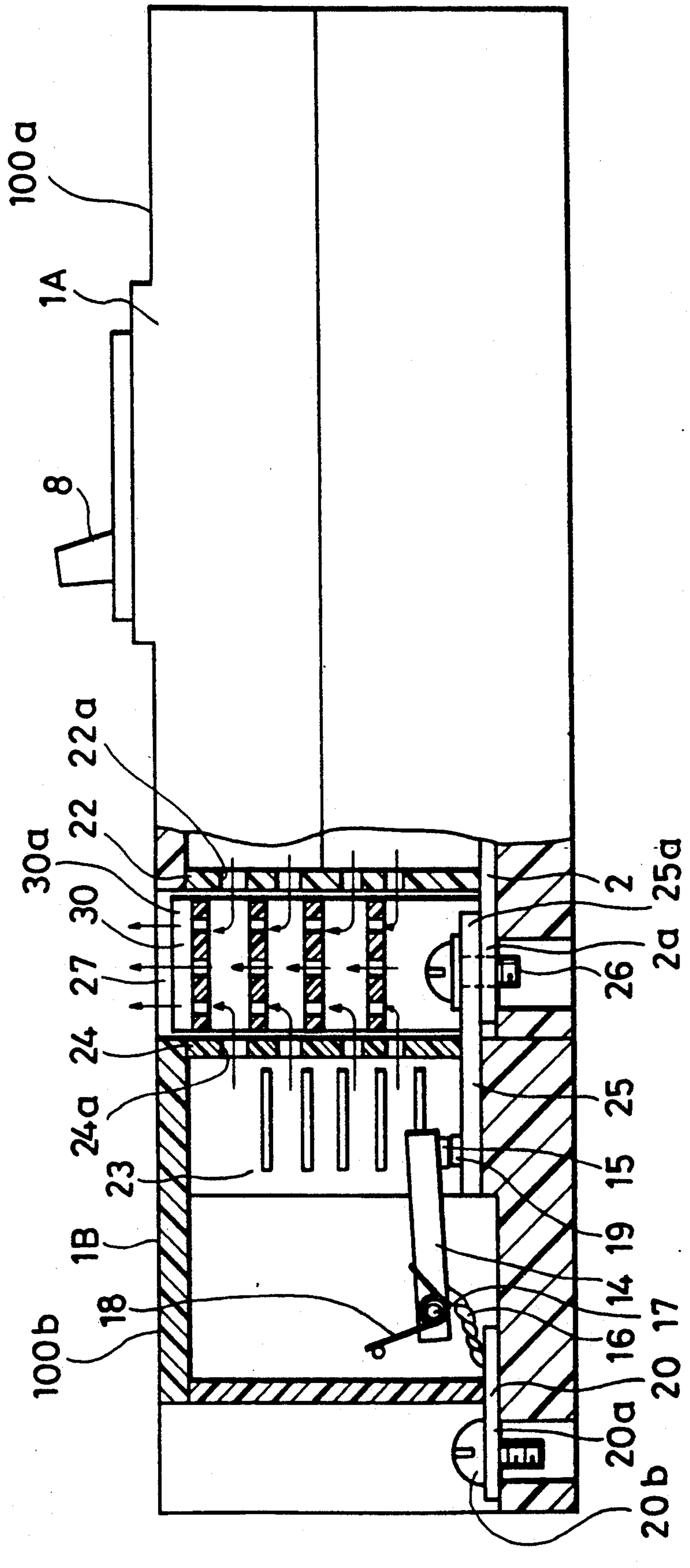
FIG. 10 is a partially longitudinal sectional view showing a current limiting circuit breaker of a fifth embodiment of the present invention.
Figure 11:
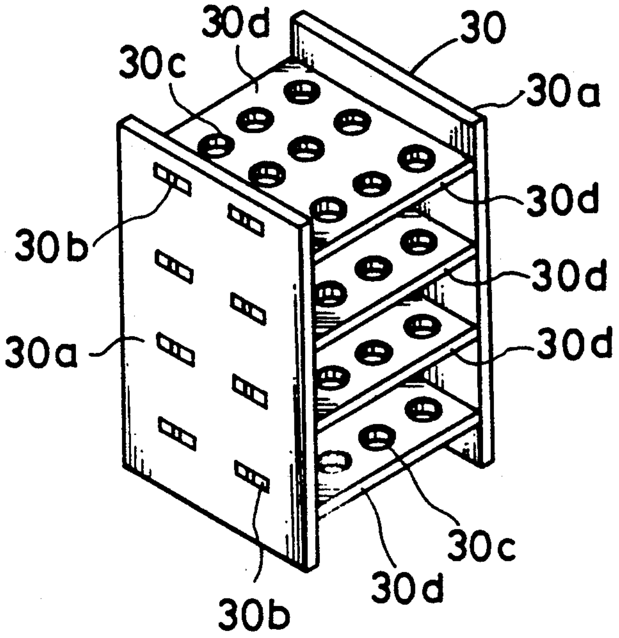
FIG. 11 is a perspective view showing an absorber shown in FIG. 10.

Next, a fifth embodiment of the current limiting circuit breaker of the present invention is elucidated with reference to the accompanying drawings of FIG. 10 and FIG. 11. FIG. 10 is the partially longitudinal sectional view of the fifth embodiment of the present invention, FIG. 11 is the perspective view of an absorber 30 in FIG. 10. Corresponding parts and components to the fourth embodiment are shown by the same numerals and marks, and the description thereon made in the fourth embodiment similarly apply. Differences and features of this fifth embodiment from the fourth embodiment are as follows.

In the current limiting circuit breaker of the fifth embodiment, an absorber 30, which is disposed in an arc gas exhaust chamber 27, comprises two holding plates 30*a* and 30*a* and four absorbing plates 30*d*, 30*d*, 30*d* and 30*d* which are disposed between both the holding plates 30*a*, 30*a*. The four absorbing plates 30*d*, 30*d*, 30*d*, and 30*d* are fixed to both the holding plates 30*a*, 30*a* by calking members 30*b* of the absorbing plates 30*d*. Also, the absorbing plates 30*d* which are made of metal, such as iron plate, have plural exhaust ports 30*c*.

Since the absorber 30 of the fifth embodiment is provided in the arc gas exhaust chamber 27, arc gas, which is exhausted from both arc gas exhaust ports 22*a* and 24*a* to the arc gas exhaust chamber 27, is cooled by the absorber 30 by passing through the exhaust ports 30*c*. Thereby, the arc discharges to the exterior of the current limiting circuit breaker is reduced.

Apart from the above-mentioned fifth embodiment wherein an insulation cover is not provided, a modified example may be such that the insulation cover 28 shown in FIG. 8 of the fourth embodiment is mounted on the front surface of the circuit breaker casing 100*a* to close the front opening of arc gas exhaust chamber 27.

Figure 12:
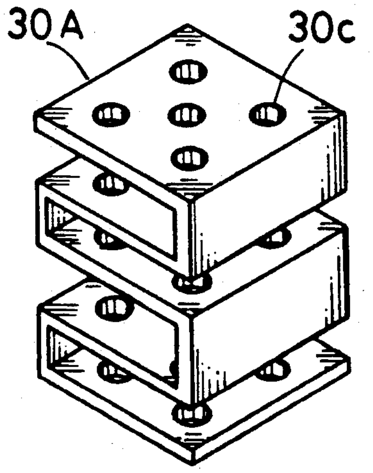
FIG. 12 and FIG. 13 are perspective views showing other examples of the absorber shown in FIG. 11.
Figure 13:
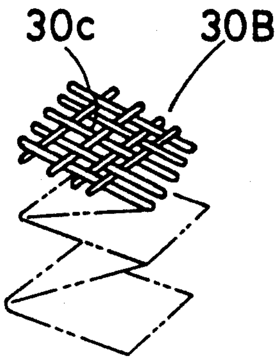

In a further modified example, the absorber 30 in the fifth embodiment can alternatively be formed as one bent plate 30A shown in FIG. 12, or as a bent wire-netting 30B shown in FIG. 13.

SIXTH EMBODIMENT

Figure 14:
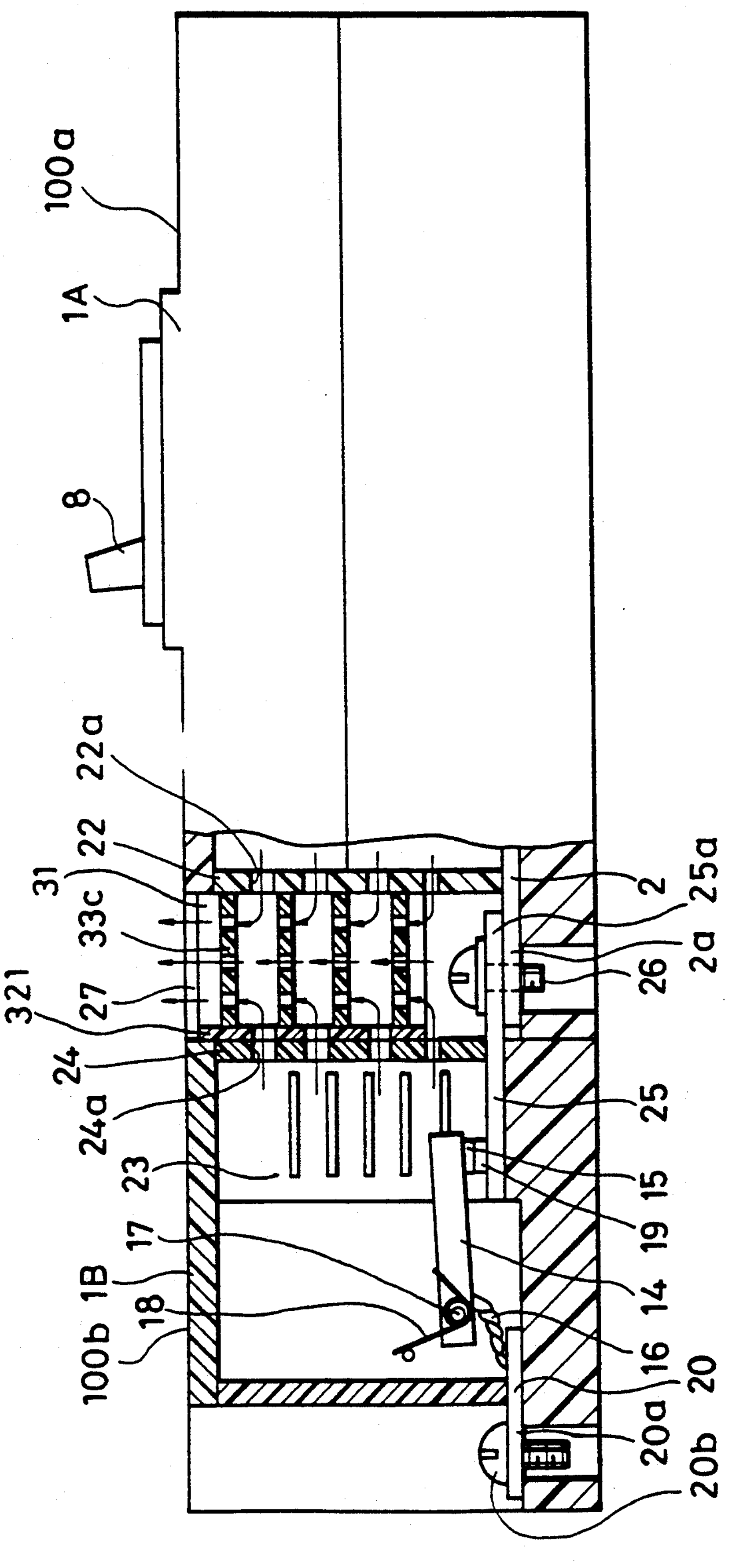
FIG. 14 is a partially longitudinal sectional view showing a current limiting circuit breaker of a sixth embodiment of the present invention.
Figure 15:
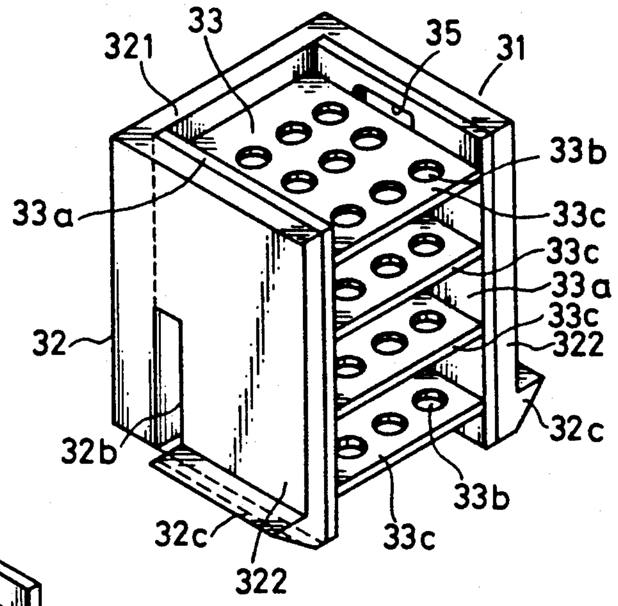
FIG. 15 is a perspective view showing an absorber unit shown in FIG. 14.
Figure 16:
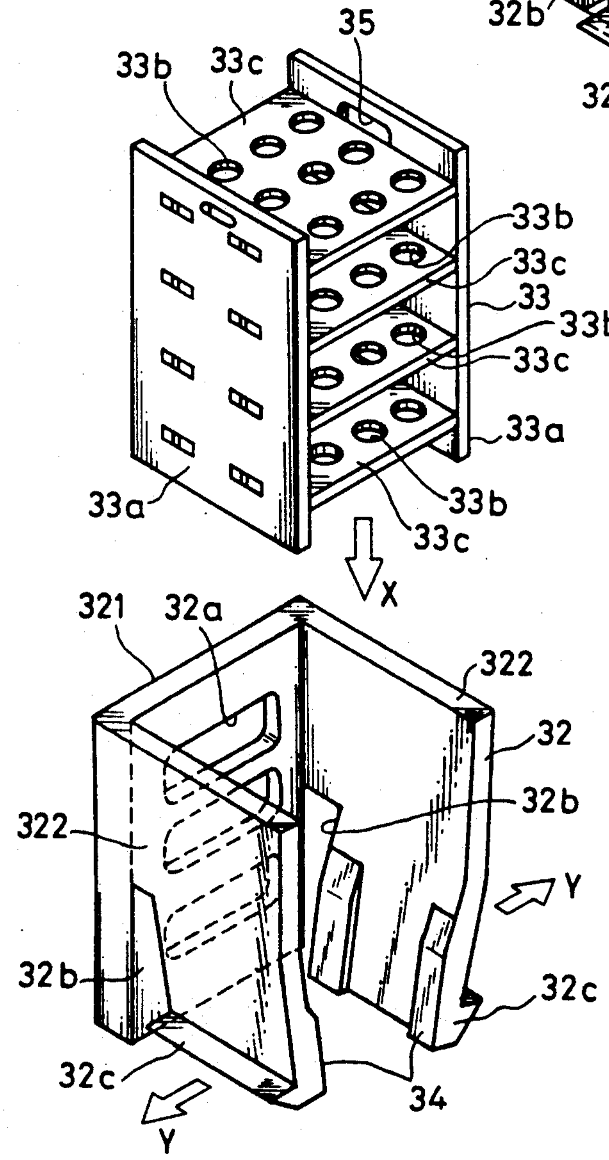
FIG. 16 is a perspective exploded view showing the absorber unit of FIG. 15.

Next, a sixth embodiment of the current limiting circuit breaker of the present invention is elucidated with reference to the accompanying drawings of FIG. 14 to FIG. 16. FIG. 14 is a partially longitudinal sectional view of the sixth embodiment of the present invention, FIG. 15 is a perspective view of an absorber unit 31 in FIG. 14, and FIG. 16 is a perspective exploded view of the absorber unit 31 of FIG. 15. Corresponding parts and components to the fifth embodiment are shown by the same numerals and marks, and the description thereon made in the fifth embodiment similarly apply. Differences and features of this sixth embodiment from the fifth embodiment are as follows.

In the sixth embodiment of the current limiting circuit breaker of the present invention, the absorber unit 31 comprises a support frame 32 fitted into an arc gas exhaust chamber 27 and absorber frame 33 to be inserted into the support frame 32. The support frame 32 has exhaust openings 32*a* at a middle portion 321 of the U-shaped support frame 32, and both side portions 322 and 322 of the support frame 32 are inwardly slanted at the lower portion where slits 32*b*, 32*b* are formed, respectively. And the both side portions 322, 322 have outwardly projection pawls 32*c*, 32*c* at the low ends of it as shown in FIG. 16, respectively. The absorber frame 33 is constructed substantially similar to the absorber 30 shown in FIG. 11 of the fifth embodiment, and comprises holding plates 33*a*, 33*a* and absorber plates 33*c*, 33*c*, 33*c* and 33*c* having plural exhaust ports 33*b*. Projections 34 of the support frame 32 are provided at the inner surface of the lower portion of the both side portions 322, 322 for strengthening fitting of absorber frame 33 inserted to the support frame 32. Pullout bores 35, 35 for pulling out the holding plates 33*a*, 33*a* from the support frame 32 are provided on the upper ends of the holding plates 33*a*, 33*a*, respectively.

When, as shown in FIG. 16, the assembly of the holding plates 33*a*, 33*a* and absorber plates 33*c*, 33*c* is not yet inserted in the support frame 32, both side portions 322, 322 of the support frame 32 are inwardly slanted at the lower portions, and both two pawls 32*c* and 32*c* are pulled in an area of the position where the absorber frame 33 should be disposed. After the support frame 32 is inserted into the arc gas exhaust chamber 27, the absorber frame 33 is inserted in the support frame 32 in a direction shown with an arrow X in FIG. 16. As a result, the absorber frame 33 pushes out the lower portions of the both side portions 322, so that both of the projection pawl 32*c* are pushed outward as shown with arrows Y, Y in FIG. 16, respectively. The projection pawls 32*c*, 32*c* shown in FIG. 15, engage with recesses (not shown) which are provided at the inner surface of the arc gas exhaust chamber 27, namely, the circuit breaker casing 100*a*. Thus, after the support frame 32 is mounted on the arc gas exhaust chamber 27, the absorber frame 33 is merely inserted into the support frame 32. Thereby, the absorber unit 31 is fixed to the current limiting circuit breaker in a manner to engage inside walls of the projection pawls 32*c*, 32*c* and the recesses of the circuit breaker casing 100*a*.

Apart from the above-mentioned embodiment wherein the projection pawls 32*c*, 32*c* are provided on both side portions 322, 322, a modified example may be such that the projection pawls 32*c*, 32*c* are provided on the inner surface of the arc gas exhaust chamber 27.

SEVENTH EMBODIMENT

Figure 17:
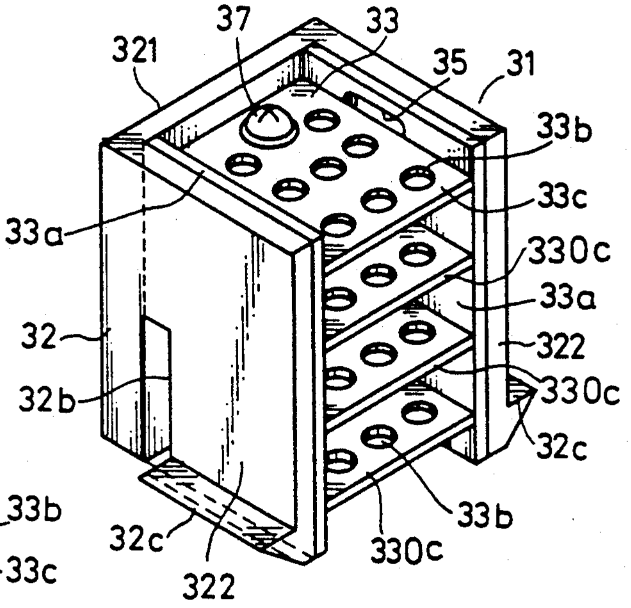
FIG. 17 is a perspective view showing other example of the absorber unit in FIG. 15, as a seventh embodiment.
Figure 18:
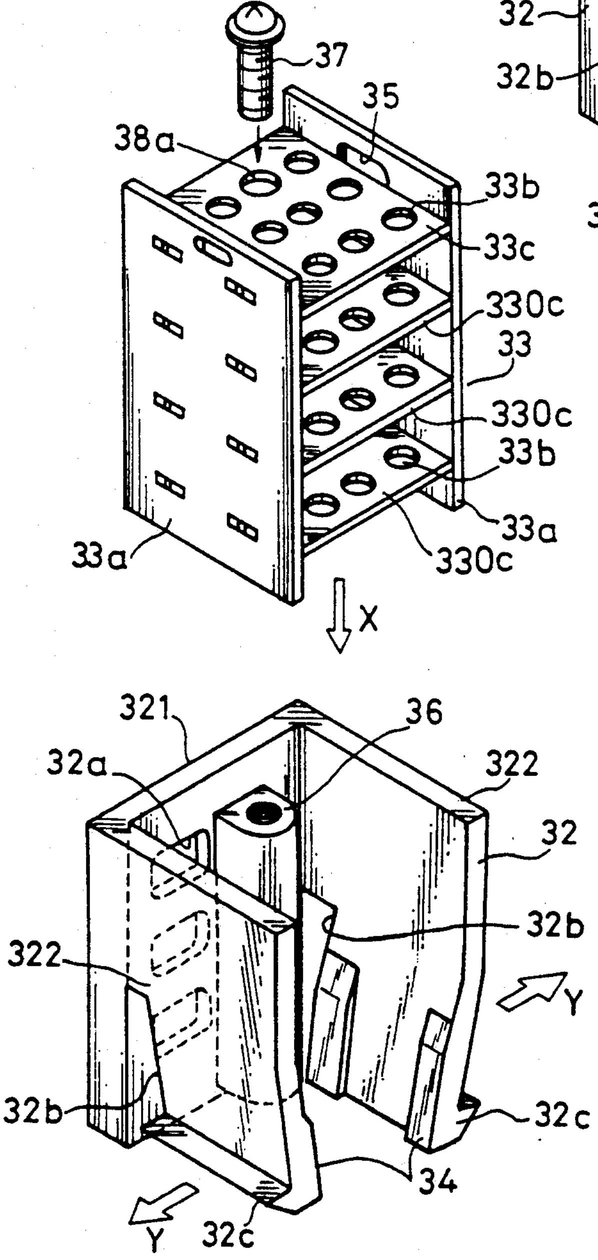
FIG. 18 is a perspective exploded view showing the absorber unit of FIG. 17.
Figure 19:
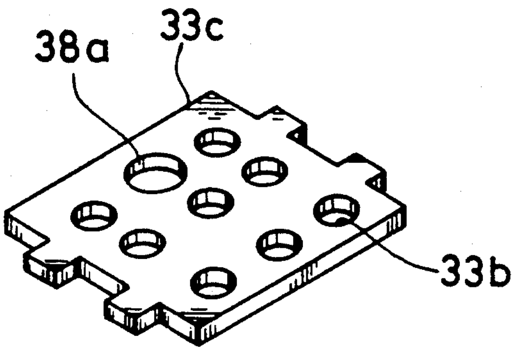
FIG. 19 is a perspective view showing an absorbing plate shown in FIG. 17.
Figure 20:
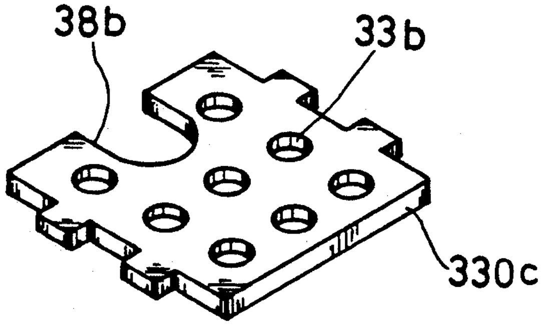
FIG. 20 is a perspective view showing another absorbing plate shown in FIG. 17.

Next, a seventh embodiment of the current limiting circuit breaker of the present invention is elucidated with reference to the accompanying drawings of FIG. 17 to FIG. 20. FIG. 17 is a perspective view of an absorber unit 31 in the seventh embodiment, FIG. 18 is a perspective exploded view of the absorber unit 31 of FIG. 17, and FIG. 19 and FIG. 20 are perspective views of the absorbing plates 33*c* and 330*c* shown in FIG. 17 and FIG. 18. Corresponding parts and components to the sixth embodiment are shown by the same numerals and marks, and the description thereon made in the sixth embodiment similarly apply. Differences and features of this seventh embodiment from the sixth embodiment are as follows.

The seventh embodiment shown in FIG. 17 to FIG. 20 adds means for fixing between a support frame 32 and an absorber unit 33 to the above-mentioned sixth embodiment shown in FIGS. 14 to 16.

In the current limiting circuit breaker of the seventh embodiment, a threaded bore column 36 is provided on the inner surface at the middle part 321 of the U-shaped support frame 32. A screw bolt insertion hole 38*a* is formed at an uppermost absorbing plates 33*c* as shown in FIG. 19, and a cutout portion 38*b* is formed at each of other absorbing plates 330*c*.

In the afore-mentioned sixth embodiment, after the support frame 32 is mounted on the arc gas exhaust chamber 27, and the absorber frame 33 is inserted into the support frame 32. The absorber frame 33 is fixed to the support frame 32 by screwing a screw bolt 37 in the threaded bore column 36 through the screw bolt insertion hole 38*a* of the uppermost absorbing plate 33*c*.

In the seventh embodiment, since the absorber frame 33 is more tightly fixed to the support frame 32 by the screw bolt 37, the absorber unit 31 is further reliably fixed to the circuit breaker casing 100*a*.

EIGHTH EMBODIMENT

Figure 21:
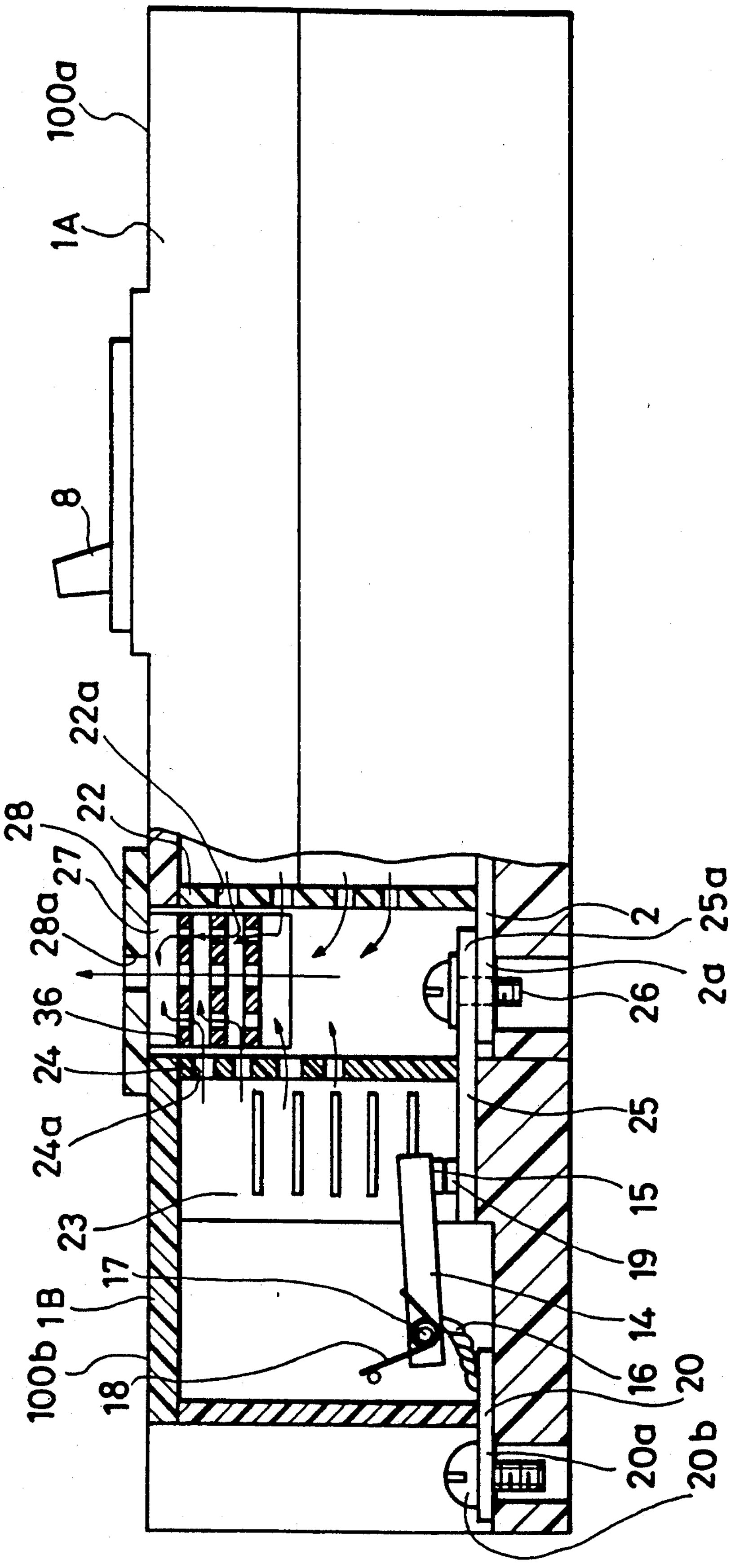
FIG. 21 is a partially longitudinal sectional side view showing a current limiting circuit breaker of a eighth embodiment of the present invention.
Figure 22:
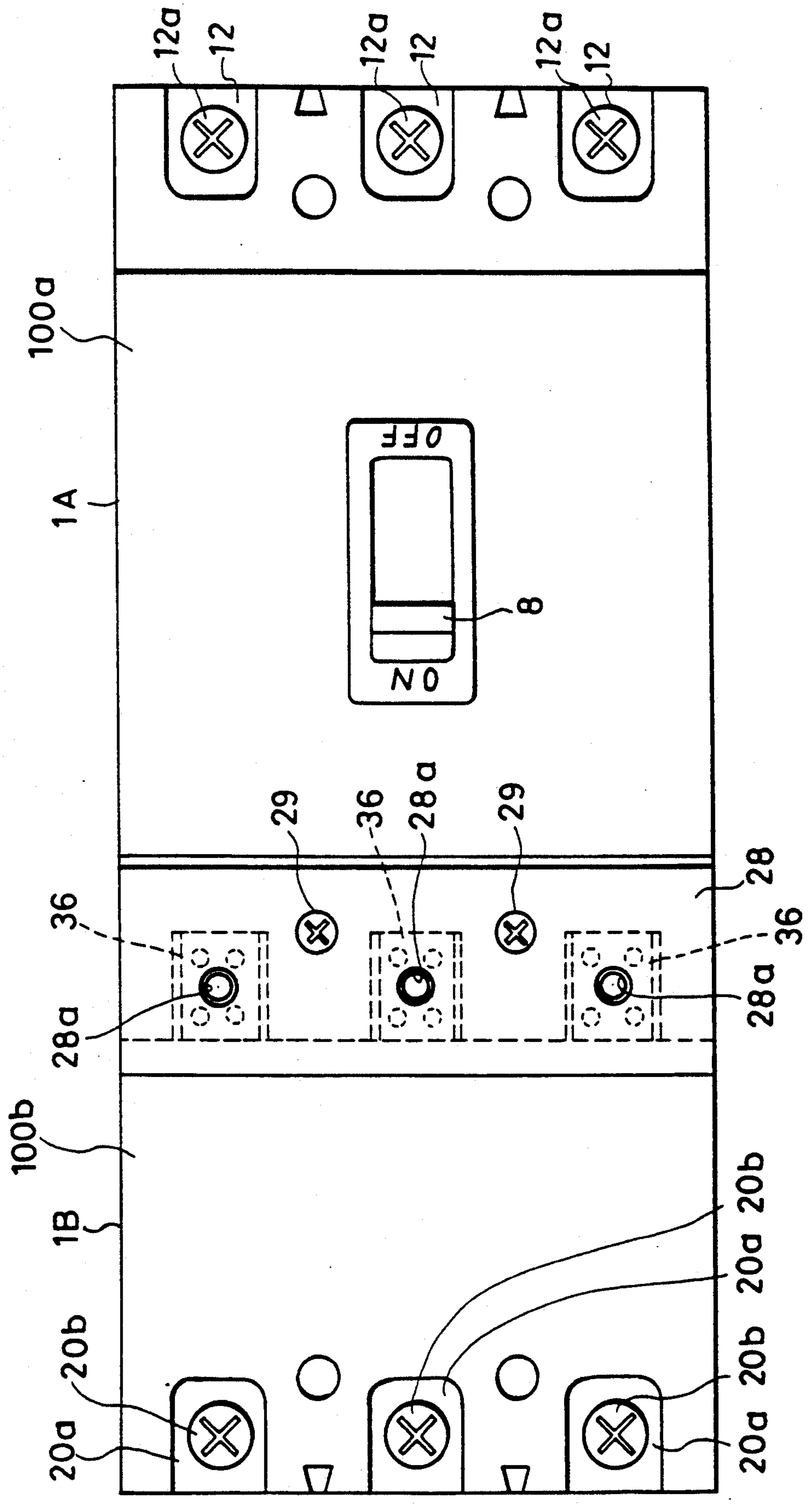
FIG. 22 is a plan view showing the current limiting circuit breaker of FIG. 21.
Figure 23:
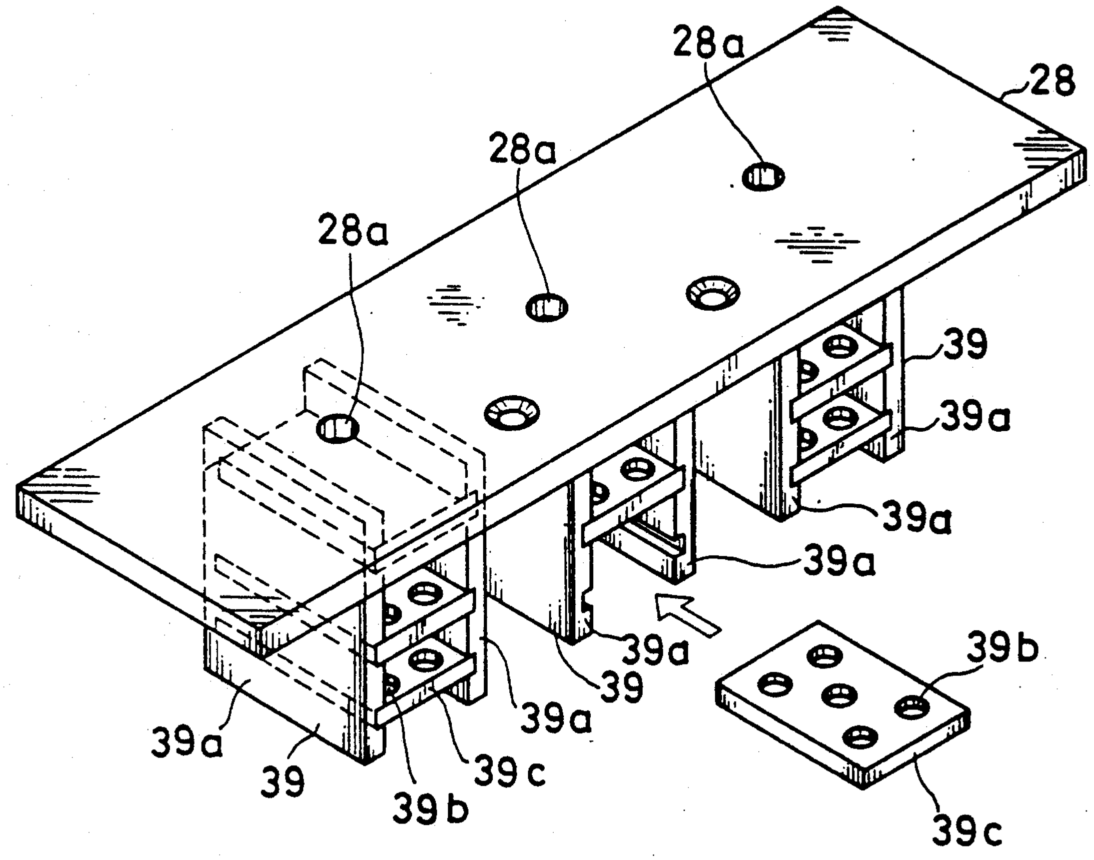
FIG. 23 is a perspective view showing an essential part of the current limiting circuit breaker of FIG. 21.
Figure 24:
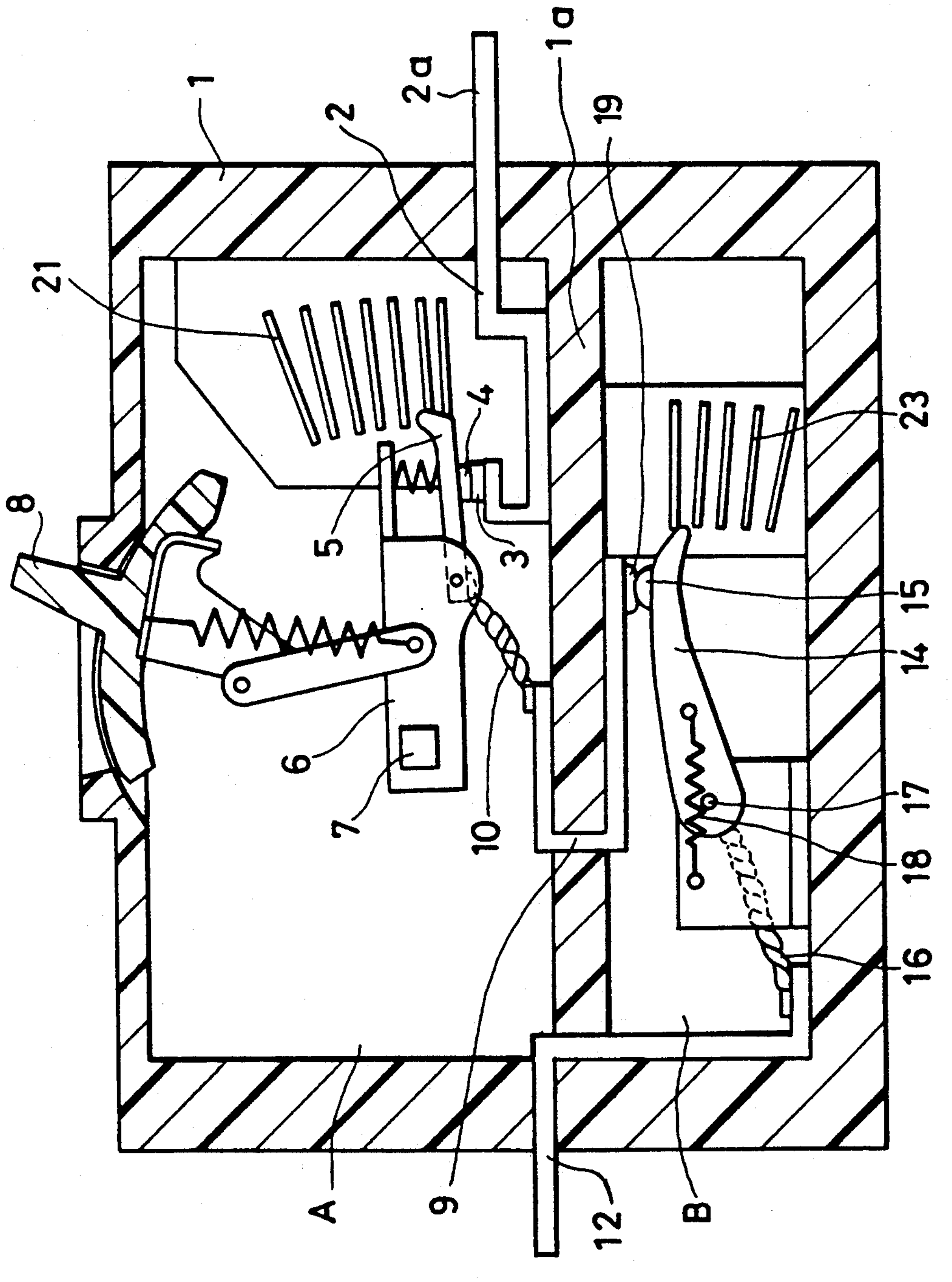
FIG. 24 (Prior Art)
FIG. 24 is the schematically sectional view showing the conventional current limiting circuit breaker.

Next, an eighth embodiment of the current limiting circuit breaker of the present invention is elucidated with reference to the accompanying drawings of FIG. 21 to FIG. 23. FIG. 21 is a partially longitudinal sectional side view of the current limiting circuit breaker of the eighth embodiment, FIG. 22 is a plan view of the current limiting circuit breaker of FIG. 21, and FIG. 23 is a perspective view of the principal portion of the eighth embodiment. Corresponding parts and components to the fourth embodiment shown in FIG. 8 and FIG. 9 are shown by the same numerals and marks, and the description thereon made in the fourth embodiment similarly apply. Differences and features of this eighth embodiment from the fourth embodiment are as follows.

In the drawings of FIGS. 21 to 23, three absorbers 39, 39 and 39 comprise holding plates 39*a* and absorbing plates 39*c* which have plural exhaust ports 39*b*. The absorbing plates 39*c* are inserted between two holding plates 39*a* and 39*a* which are fixed to an insulation cover 28, as shown in FIG. 23.

In the eighth embodiment, since the absorbers 39 are attached to the insulation cover 28, the absorbers 39 can be disposed in arc gas exhaust chambers 27 by the configuration that the insulation cover 28 is mounted only on the circuit breaker casing 100*a*, thereby easily disposing the absorbers 39 at their accurate positions.

As seen from the above-mentioned embodiments, the current limiting circuit breaker of the present invention can be used in a thin board, such as a thin distribution board, and attains the effect of miniaturization of an apparatus, and reduction of arc discharge, and provides the current limiting circuit breakers of easy for to use.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A current limiting circuit breaker which is a combination of a circuit breaker unit and at least one current limiting unit, comprising:

a circuit breaker unit which includes circuit breaking means, a breaker connection terminal at one end, and a load side terminal at an other end; and at least one current limiting unit which includes at least one current limiting means, at least one power source side terminal at one end, and at least one limiter connection terminal at an other end, said limiter connection terminal being for connection with said breaker connection terminal or with a power source side terminal of another current limiting unit, wherein said limiter connection terminal projects from an end face of a casing of said current limiting unit at a height such that a lower face thereof fits on an upper face of said breaker connection terminal, and wherein said power source side terminal is provided at a same height as that of said breaker connection terminal.

* * * * *